United States Patent [19]
Breed

[11] Patent Number: 5,337,259
[45] Date of Patent: Aug. 9, 1994

[54] DIPOLE DETECTION AND LOCALIZATION PROCESSING

[75] Inventor: Ben R. Breed, Austin, Tex.

[73] Assignee: Hughes Aircraft Company, Los Angeles, Calif.

[21] Appl. No.: 24,574

[22] Filed: Mar. 1, 1993

[51] Int. Cl.$^5$ .......................... G01B 7/14; G01C 21/00
[52] U.S. Cl. ...................................... 364/559; 364/449; 324/207.13; 324/207.26
[58] Field of Search .............................. 364/449, 559; 324/207.13, 207.14, 207.26

[56] References Cited

U.S. PATENT DOCUMENTS

| | | | |
|---|---|---|---|
| 4,492,923 | 1/1985 | Byram | 324/207.26 |
| 4,600,883 | 7/1986 | Egli et al. | 324/207.26 |
| 4,622,644 | 11/1986 | Hansen | 364/559 |
| 4,710,708 | 12/1987 | Rorden et al. | 364/449 X |
| 5,239,474 | 8/1993 | Eaton, Jr. et al. | 364/449 |
| 5,264,793 | 11/1993 | Lo et al. | 324/207.13 |

Primary Examiner—Jack B. Harvey
Assistant Examiner—Eric W. Stamber
Attorney, Agent, or Firm—W. K. Denson-Low

[57] ABSTRACT

Dipole detection and localization systems and methods employing improved processing techniques. The first processing technique provides for higher spatial resolution by implementing maximum likelihood beamforming processing to detect and locate a dipole in a manner analogous to the processing of wave propagation phenomena. The high resolution technique is comprised of using data derived from an array of magnetic sensors that is arranged in the form of a vector of coefficients in lieu of a matrix. This vector can be either the magnetic field components or the Anderson function expansion coefficients and is used to form a dyadic matrix, to which a multiple of an identity matrix is added to prevent singularity. The second improvement uses more than three Anderson function expansions to achieve detection and localization of the dipole. The use of more than three Anderson functions more effectively normalizes the noise dependence by providing better noise representations, and provides for detection and localization of multipoles. The third improvement provides for multiple-pass multiple-target processing of data measured by the array of sensors. First, the location of the largest dipole in the field-space of the array is determined, and its moment and orientation are determined. The field due to a dipole at that location and orientation is then removed from the measurement data and the process is repeated. The field is removed by subtracting out its contribution at each of the sensors in the array, and then estimating the location of the next largest dipole. Simulations have shown that this process provides the ability to resolve multiple dipoles, when applied as many times as is needed.

3 Claims, 7 Drawing Sheets

HIGH RESOLUTION PROCESSING FLOW DIAGRAM

HIGH RESOLUTION PROCESSING FLOW DIAGRAM

Fig. 3

HIGHER ORDER ANDERSON FUNCTION PROCESSING FLOW DIAGRAM

Fig. 4

MULTIPLE PROCESSING TO RESOLVE MULTIPLE DIPOLES FLOW DIAGRAM

DIPOLE DETECTION AND LOCALIZATION PROCESSING

BACKGROUND

The present invention relates generally to dipole detection and location processing, and more particularly, to processing and processing apparatus that provides for higher spatial resolution, that provides for the use of more than three Anderson functions in the Anderson function expansions, and for the use of multiple processing of data and subtractions to achieve multiple target resolution.

The improvements provided by the present invention relate to the dipole moment detection and localization invention described in copending U.S. patent application Ser. No. 07/616,158, filed Nov. 20, 1990 now U.S. Pat. No. 5,239,474, which is assigned to the assignee of the present invention. The dipole moment detection and localization described in this application provides for an improved method of processing multiple field sensors in a dipole field than any method previously used. In this dipole moment detection and localization system, detection and localization is accomplished using the outputs from a fixed vector- or total-field-magnetometer array. The dipole moment detection and localization described in this patent application has yielded dramatic performance improvement over existing magnetic anomaly detection systems that use a single sensor to detect a change in the total local magnetic field derived from a dipole.

Therefore, it is an objective of the present invention to provide for dipole moment detection and localization processing systems and methods that provide for higher resolution of dipoles, the use of higher order Anderson functions in order to provide for better detection and localization of multiple dipoles, and processing techniques that also provide for the detection and localization of multiple target detection within the field of the sensors by field subtraction techniques.

SUMMARY OF THE INVENTION

In order to improve the processing capabilities of the invention disclosed in the above-identified patent application, the present invention provides for an improved dipole detection and localization system and processing method that employs one or more of three processing techniques that improve various aspects of this detection and localization system. The first improvement is a high resolution processing technique, similar to a maximum likelihood beamforming technique. The second improvement is an extension of the Anderson function expansion technique to include more than three terms. The third improvement provides for multiple processing and subtraction to resolve closely spaced targets or targets with highly differing dipole moments, or for pairs of targets, one of which is substantially closer to a magnetometer ,array (array of sensors) of the detection and localization system.

The first improvement provides for higher spatial resolution by extending the capabilities of the dipole moment detection and localization processing technique used in a processor of the detection and localization system in analogy to a maximum likelihood beamforming process to detect and locate wave propagation phenomena. The high resolution improvement is comprised of using the sensors' data in the form of a vector of coefficients (rather than a matrix). The use of this vector to form a dyadic matrix mimicking a correlation matrix, such as in acoustic maximum-likelihood beamforming, and adding a multiple of the identity to the dyadic matrix to prevent it from becoming singular.

The second improvement to dipole moment detection and localization processing extends the Anderson function expansions employed in the detection and localization system to include more than three Anderson functions. The use of more than three Anderson functions is most effective of normalizing out the range dependence of the precomputed beamforming coefficients and is more effective in noise and clutter represenrrations. This is particularly effective when the high resolution process described above is not used, and a relatively high output resolution is present in the processed signals. In the present invention, the field resulting from a single dipole using only three Anderson functions is expanded to a higher number of functions (five, for example) without any residual error, but noise effects and multipole field effects are more accurately represented. Noise sources and other phenomena such as fields due to higher order multipoles, and in particular multiple dipoles, cannot be completely expanded in terms of only three Anderson functions. The present invention increases the number of Anderson functions used in processing target data to provide for better detection and localization in a noise environment or in the case of closely spaced dipoles.

The third improvement provides for multiple-pass multiple target processing of data measured by the array of sensors comprising the magnetometer array. First, the location of the largest dipole in the field-space of the array is determined, and its moment and orientation are determined. The field due to a dipole at that location and orientation is then removed from the measurements and the process is repeated. The field is removed by subtracting out its contribution to each of the sensors in the magnetometer array, and then estimating the location of the second largest dipole. Simulations have shown that this process provides the ability to resolve multiple targets.

The high resolution processing technique has been shown by means of simulated data and field data to provide more accurate locations for a dipole in the presence or absence of noise. By employing the high resolution processing technique, the present dipole moment detection and location system and processing method will be able to detect and more accurately locate smaller objects. The ability to achieve higher location resolution also helps in discrimination against closely spaced clutter dipole anomalies.

It is known that the representation of the magnetic field of a single dipole requires the use of only three Anderson functions. However, it has been determined that the use of more than three Anderson functions in the processing has the following advantages. It extends the capabilities of the process to provide for simultaneous matched-field processing of more than one dipole. A more complete expansion of the noise terms of the signal derived from the sensors is achieved, which noise terms are used to provide better noise normalization which is important for sensing the presence of the dipoles. Additionally, static fields, such as quadrapole or other multipole fields, may be used to detect targets, or gradiometer readings of a field measurement in which the space-gradient of the field is measured rather the field itself may also be used to detect targets by employing more than the three Anderson functions appropriate for a static dipole.

The use of multiple pass processing provides for the detection of a dipole located in the presence of another dipole that has a much larger magnetic field or is located closer to the array. This is important when a smaller target dipole tries to hide by locating itself in the general neighborhood of a larger target dipole. While the new multiple pass approach does not offer a complete solution to this problem, it is a much better solution than if it were not used. It has been shown by way of simulations that the present invention is able to separate targets that are not separable using single pass processing.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
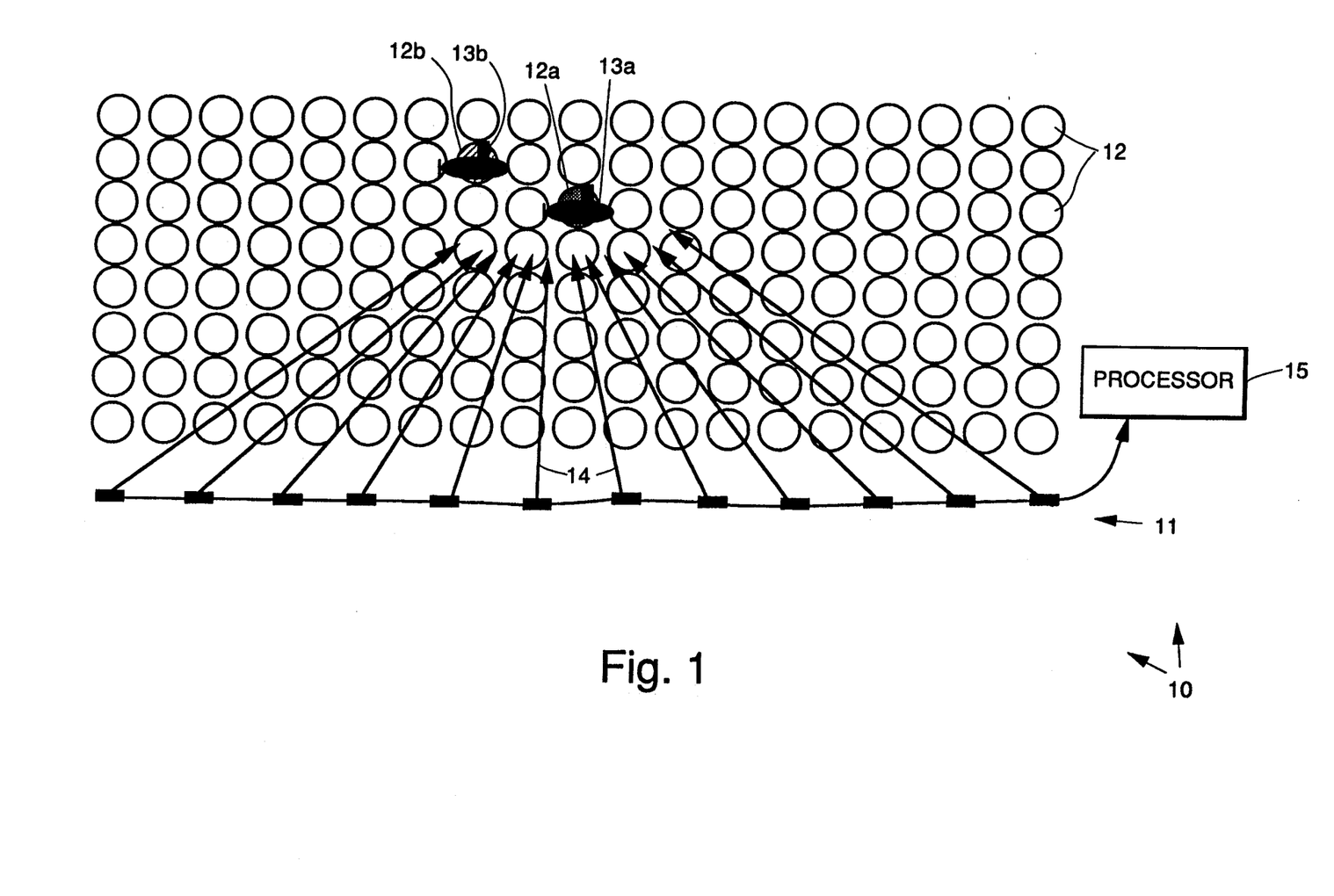
FIG. 1 is a block diagram showing a portion of the aforementioned dipole moment detection and localization system that is useful in understanding the present invention.

Referring to the drawing figures, FIG. 1 shows a dipole moment detector and localizer system 10 that employs dipole moment detection and localization processing in accordance with the principles of the present invention. The sensor portion of this system 10 is described in U.S. patent application Ser. No. 07/616,158, filed Nov. 20, 1990 now U.S. Pat. No. 5,239,474. This system 10 employs a fixed, nominally linear but not restricted to linear, array of magnetic sensors 11 to detect and localize a first dipole 13a. A better understanding of the design and operation of this system 10 may be had from a reading of the above-identified patent application. The system disclosed in the above-cited patent application has the ability to adequately detect and localize only the first dipole 13a if the first dipole 13a is substantially larger or is substantially closer to the array of magnetometers. The processing provided by the present invention, however, provides the ability to detect and localize additional dipoles 13b, that are located in the vicinity of the first dipole 13a, as will be described below.

More particularly, FIG. 1 shows a detection and location system 10 that includes an array of magnetic sensors 11 that is coupled to processing apparatus 15. The array of circular locations represent magnetic response locations 12 that are searched for the presence of dipoles relative to the array of magnetic sensors 11. The magnetic response locations 12 have precomputed magnetic responses associated therewith that represent the magnetic field that would result if a magnetic dipole were present within each particular magnetic response location 12 at a plurality of different orientations. Also shown in FIG. 1 are two particular magnetic response locations 12a, 12b (highlighted) in which the first and second magnetic dipoles 13a, 13b are located, each having different field strengths. For the purposes of this description, the first magnetic dipole 13a has a relatively large field strength compared to the second magnetic dipole 13b. A plurality of arrows representing localization vectors 14 are shown extending from each sensor of the array of magnetic sensors 11 toward the magnetic response location 12a in which the first magnetic dipole 13a is located. Each sensor's reading contributes a set of vectors indicative of the location of the first magnetic dipole 13a, thereby forming a sensed signature that is processed using the concepts of the present invention as described below. A similar signature is also formed for the second magnetic dipole 13b, and the total signature is the simple sum of the two signatures.

Figure 2:
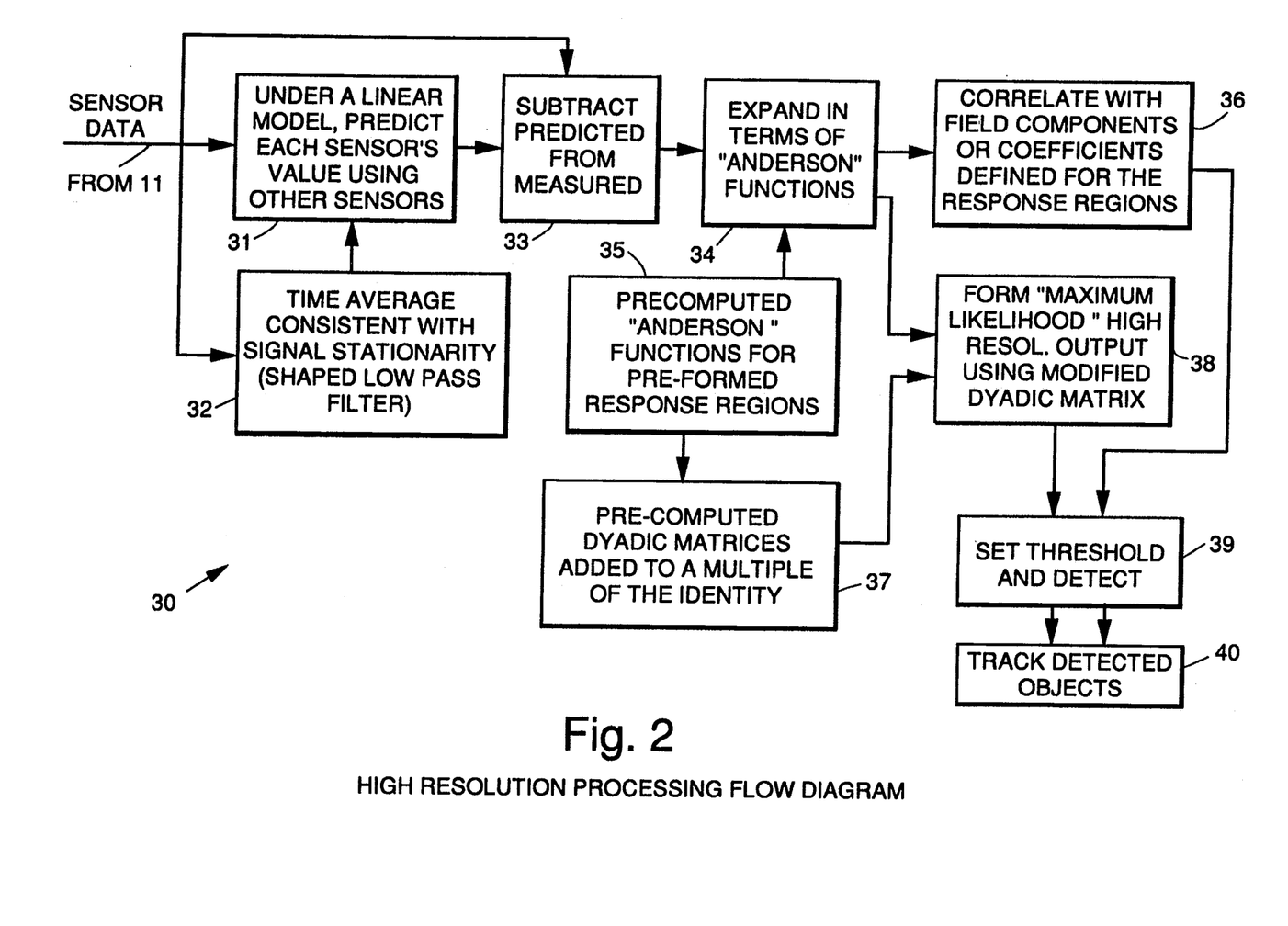
FIG. 2 shows a flow diagram with an additional processing path that is representative of high resolution processing in accordance with the principles of the present invention.
Figure 3:
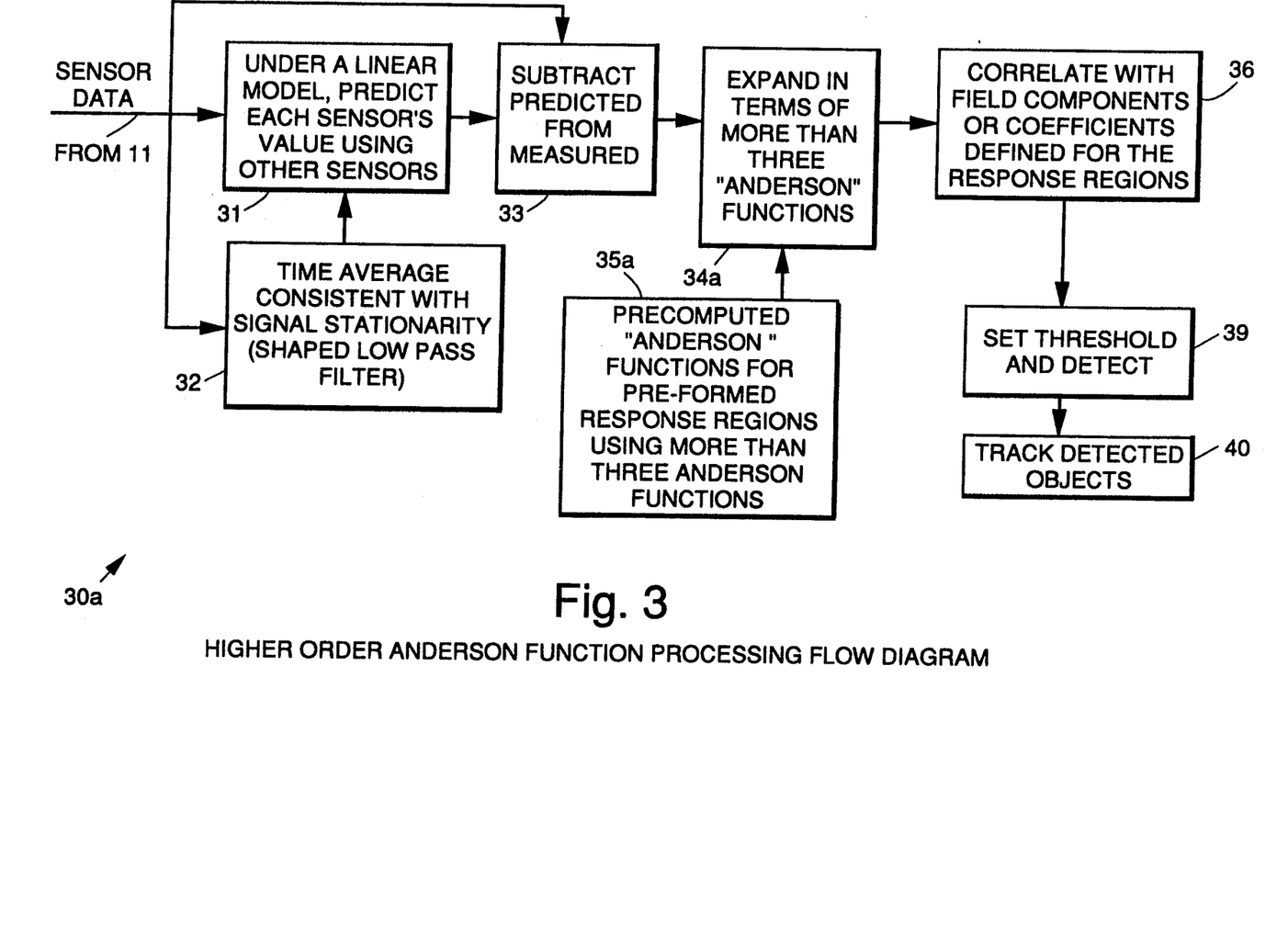
FIG. 3 shows a flow diagram illustrating the use of extended Anderson function coefficients to achieve multiple dipole detection and localization in accordance with the principles of the present invention.
Figure 4:
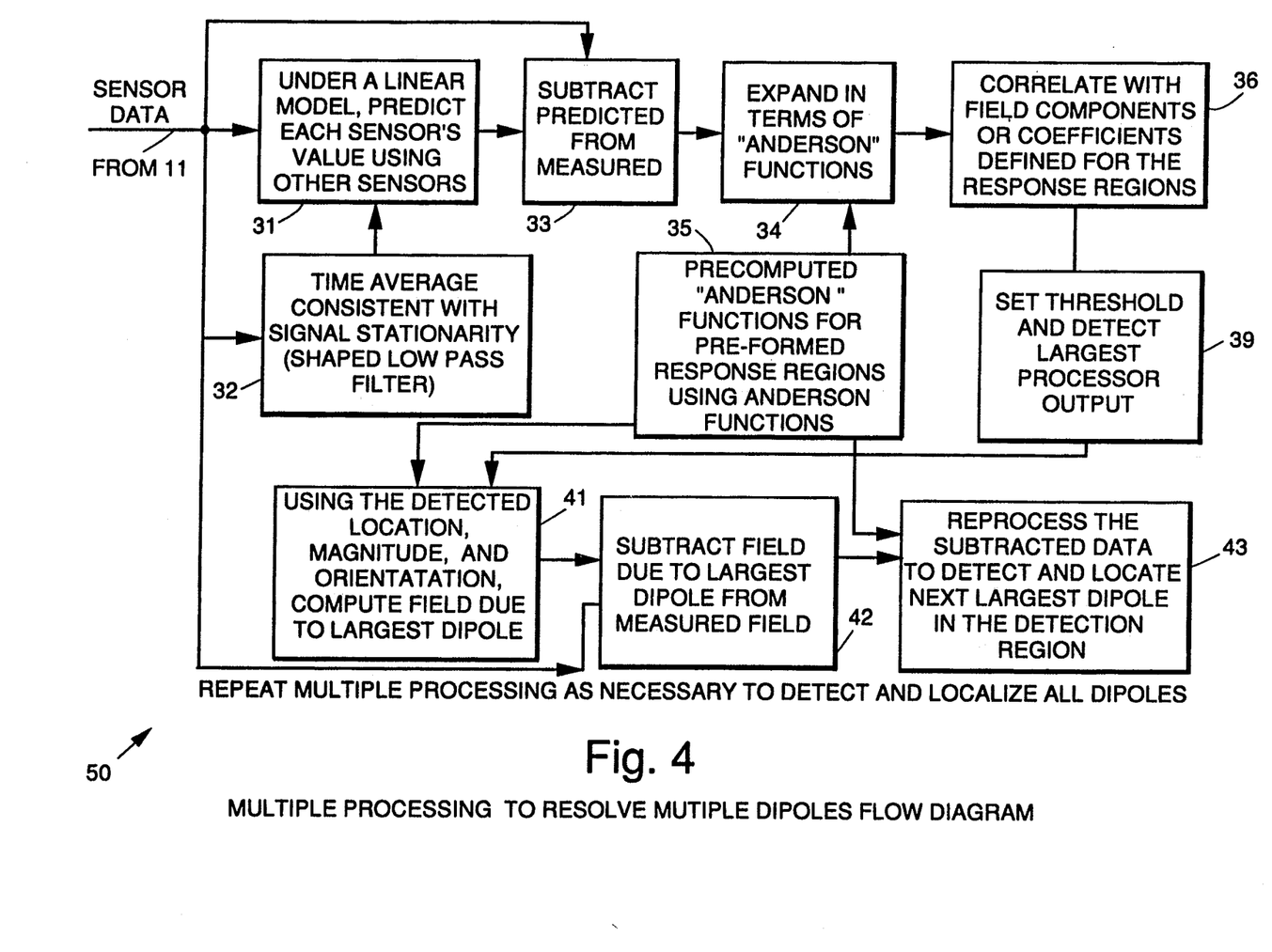
FIG. 4 shows a flow diagram representative of multiple pass multiple dipole processing in accordance with the principles of the present invention.

With reference to FIG. 2, in a first aspect of the present invention, high resolution processing in accordance with the present invention is achieved as follows. FIG. 2 shows a flow diagram representative of high resolution processing in accordance with the principles of the present invention. FIGS. 3 and 4, in turn, show the modifications for achieving the extended Anderson function approach in accordance with the present invention, and the multiple processing approach to resolving closely spaced dipoles or dipoles embedded in magnetic clutter, in accordance with the present invention.

By way of introduction, dipole moment detection and localization is based on a matched-field processing approach applied to magnetic fields analogously, to acoustic matched field processing introduced for the modal propagation of acoustic fields in a bounded region such as in a shallow water application. The matched-field process is based on a matched-filter concept, which is in turn based on the Cauchy-Schwarz inequality of functional analysis. A beamformer used in sonar and radar is based on this concept, since it is a matched processor for a plane wave arriving from a given direction. The high resolution process described herein extends this acoustic analogy to make it applicable to magnetic fields rather than acoustic propagations.

High resolution processes in sonar and radar are generally based on the use of a sensor-to-sensor signal-plus-noise or noise-alone cross-correlation matrix. The power output of a conventional beamformer is given by the so-called Bartlett form $$J(\Theta) = B^T(\Theta) R\, B(\Theta)$$

where $B(\Theta)$ is a steering vector of the beam and R is a cross-correlation matrix. The result has a maximum value when the steering vector is in the direction of the largest field source. The maximum likelihood beamformer, on the other hand, has the form $$J_{ML}(\Theta) = (B^T(\Theta)B(\Theta))/(B^T(\Theta)R^{-1}B(\Theta)).$$

When there is a single strong source in the field of the array of magnetic sensors 11 the correlation matrix is close to singular, meaning that the matrix determinant is close to zero, and the result for that direction is the reciprocal of a small number (a very large number), and the resolution in terms of the sharpness of the response as a function of steering direction is much better than in a conventional beamformer.

To apply the above analysis (as indicated in FIG. 2) to the dipole moment detection and localization process to implement the present invention, several conceptual changes are applied. First, in dipole moment detection and localization, time (or noise stationarity) is not readily available to form a correlation matrix for the array of sensors 11. Therefore a dyadic matrix $a^T a$ is formed that is the dyadic product of a vector a with itself. The vector comprises the Anderson coefficients of the measurements, or as well it can be the vector of magnetic field measurements. A dyadic product is formed by the multiplication of a column vector by a row vector. The second conceptual change is comprised of constructing this vector of the measurements. For the conventional dipole moment detection and localization process, the coefficients are organized as a set of three-by-three matrices, one row or column-m for each of the three components of the measured field, and the other dimension represents the order of the respective Anderson functions. The high resolution processing of the present invention puts this arrangement in a completely new order, namely that of a vector with up to $3 \times 3 = 9$ components, or an $N \times N$ vector in case the field measurements rather than Anderson coefficients are used. N is the number of sensor (magnetometer) measurements. This is required in order to form the dyadic matrix. A third concept is required to complete the construction of the high resolution process, which is comparable to a maximum likelihood beamforming process. This provides for alleviation of the high degree of singularity of the dyadic matrix. This is accomplished by adding a small multiple of an identity matrix to the dyadic matrix. The quadratic output of the conventional dipole moment detection and localization process has the Bartlett form:

$$J(x,y,z,\Phi) = (\alpha^T(x,y,z,\Phi) R \alpha^T(x,y,z,\Phi) + \epsilon I)$$

where $$R = rr^T$$

and where the precomputed Anderson function coefficients for a location $(x,y,z\Phi)$ are put into the vector $\alpha(x,y,z,\Phi)$ and the vector r is the same vector of coefficients for the measured as opposed to precomputed coefficients. The quadratic output of the newly constructed high-resolution process has the form:

$$J_{ML}(\Theta) = (\alpha^T(x,y,z,\Phi)\alpha(x,y,z,\Phi))/(\alpha^T(x,y,z,\Phi)(R_{dyad}+\epsilon I)^{-1}\alpha^T(x,y,z,\Phi))$$

where $R_{dyad} = rr^T$. The evaluation of this expression is the process depicted in FIG. 2, in process steps 37 and 38. An examination of this expression using the fact that the $\alpha$'s and r's are normalized shows that as the precomputed and measured coefficients match, the denominator becomes small as in the analogous sonar or radar situation. When the field measurements are used, the a-vectors in this development are replaced by the field measurements.

More particularly, and with reference to FIG. 2, it shows a flow diagram illustrating a high resolution processing method 30 in accordance with the principles of the present invention. In a first processing step 31, data from the array of sensors 11 is processed using a linear model to predict each sensor's value using the other sensors. In addition, in a second processing step 32, the data is time averaged to perform a long term integration thereof which operates as a low pass filter on the data. This data is used to adjust the values of the data computed in the first processing step 31. Furthermore, in a third processing step 33, the predicted sensor data value, as modified by the time averaged data, is subtracted from the measured data data. The first three process steps 31, 32, 33 are noise normalization processes common to all forms of the dipole detection and localization processors, and equivalent to the application of an inverse correlation matrix, well known to achieve noise normalization.

The resultant data is processed against the set of stored Anderson functions in step 34. Prior to operational use of the present invention, and as is indicated in process step 35, stored data is generated in terms of the Anderson functions which comprise magnetic responses associated with each of the maximum response locations 12 that represent the magnetic field that would result if a magnetic dipole were present within each particular maximum response location 12. The processing results in a set of measured Anderson coefficients.

The measured Anderson coefficients are then matched filtered (correlated) against a precomputed set of Anderson coefficients comprising the set of magnetic signatures for a plurality of orientations at any one of the magnetic response location in processing step 36. This correlation comprises a dot product of the two sets of data, and the correlation produces sharply increased normalized values when the two data values are substantially the same, while producing relatively low values when the data is only moderately different.

An additional processing path comprising two process steps 37, 38 is representative of high resolution processing in accordance with the principles of the present invention. In process step 37, the precomputed dyadic matrices are added to a multiple of the identity matrix. In process step 38, a maximum likelihood high resolution output is formed using the modified dyadic matrix derived from step 37.

The outputs of the correlation processing step 36 and the high resolution processing step 38 are processed in step 39, wherein a threshold is set and targets are detected. The final step of the method 30 is to track detected target objects, as is indicated in processing step 40.

Figure 5A:
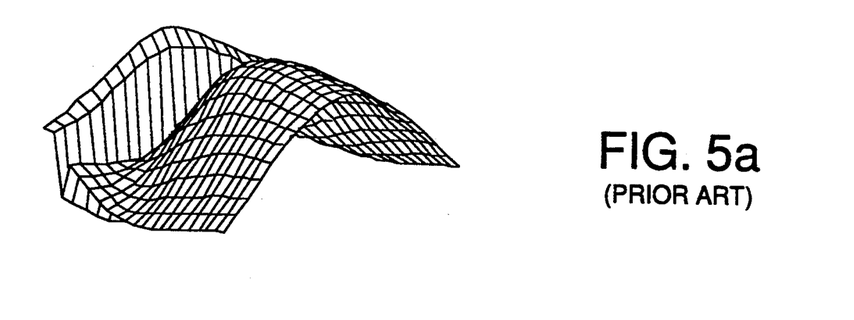
FIGS. 5a and 5b show mesh and contour plots of the matched-field response for a conventional detection and localization process.
Figure 5B:
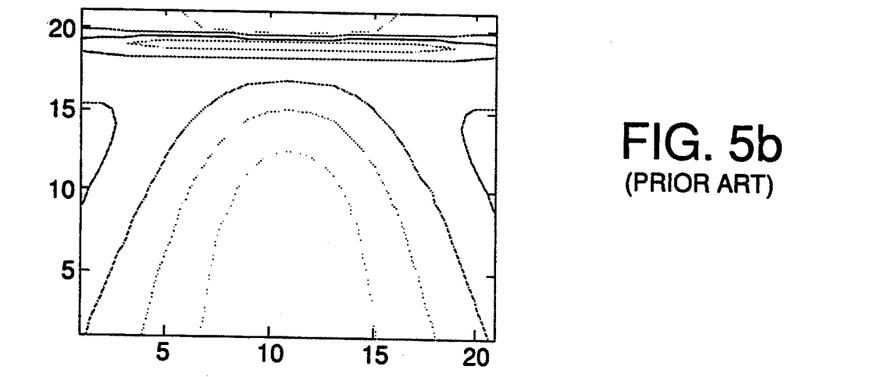
Figure 5C:
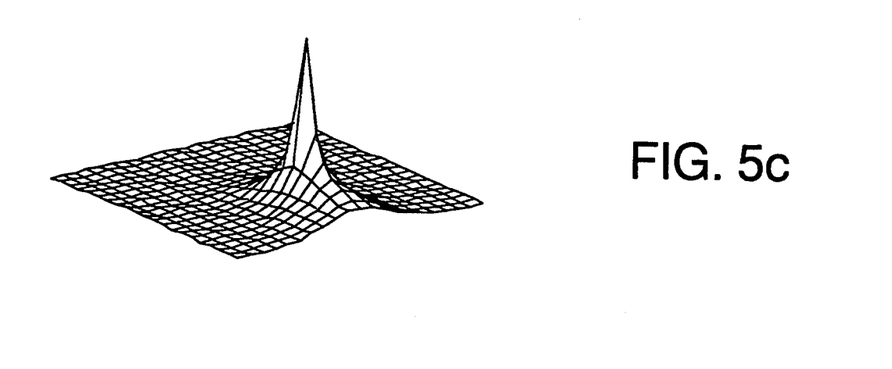
FIG. 5c and 5d show mesh and contour plots of the high-resolution response in accordance with the present invention.
Figure 5D:
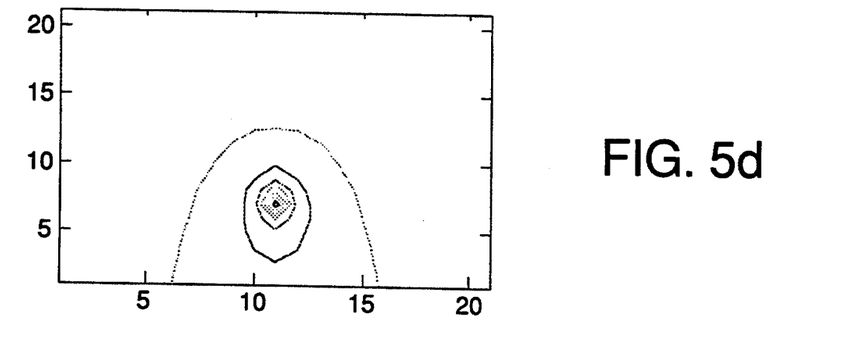

FIGS. 5a–5d show the difference in the resolving capabilities of the high resolution processing of the present invention compared to conventional dipole moment detection and localization matched-field processing provided by the invention disclosed in the above-cited patent application. FIGS. 5a and 5b show mesh and contour plots of the matched field processor output, while FIGS. 5c and 5d show mesh and contour plots of the high resolution processor output of the present invention. The peaks shown in FIGS. 5c and 5d are located precisely at simulated dipole locations, and are much sharper (higher resolution) for the high-resolution processor.

In a second processing method 30a of the present invention, extended Anderson function expansions are achieved as follows. FIG. 3 shows a flow diagram illustrating the method 30a and the use of extended Anderson function coefficients to achieve improved dipole detection and localization in accordance with the principles of the present invention. FIG. 3 is substantially the same as FIG. 2 except that the high resolution processing steps 37, 38 are not present, the expansion step 34 provides for expansion using more than three Anderson functions, and is indicated in processing step 34a, and the precomputing step 35 provides for the use of more than three Anderson functions, and is indicated in processing step 35a. The processing is generally as has been described previously, but the improvements provided by using more than three Anderson functions is expanded upon below.

It is generally well-known that the complete description of the field of a dipole 13a requires the use of only three Anderson functions. The use of more than three Anderson functions when processing a dipole 13a provides an improvement as far as noise (or anomaly) rejection is concerned. This is particularly true when comparing the conventional dipole moment detection and localization process to the high resolution processing of the present invention.

The expansion of the sensor measurements in terms of Anderson functions is analogous to the expansion of an acoustic array's measurements in terms of arriving plane-waves (a wave-number decomposition). The finer the decomposition the greater the ability to reject sources of interference. Another analogy is to spectral decomposition in terms of a Fourier transform. If only a few of the possible trigonometric functions are used in the expansion, a complete description of the power density spectrum is not achieved.

Figure 6A:
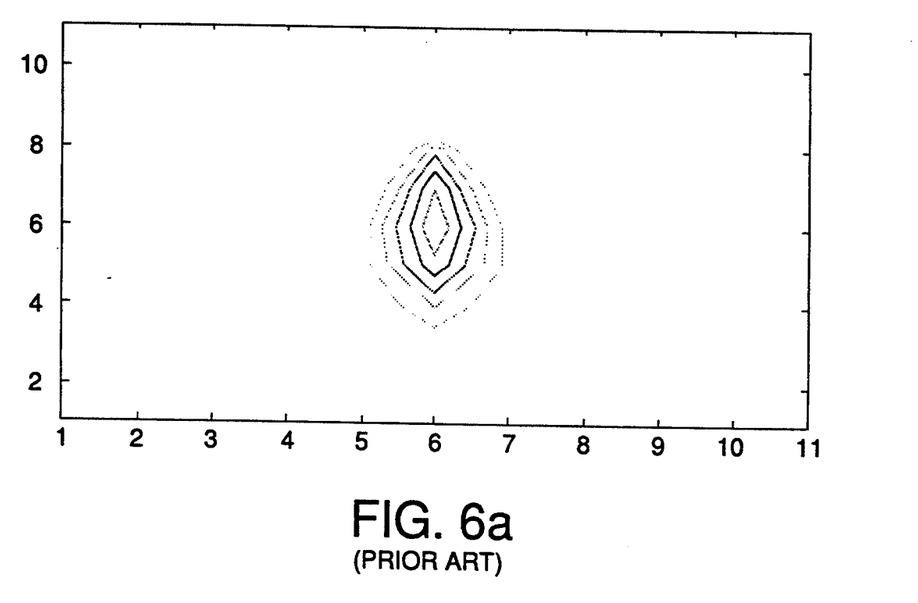
FIG. 6a shows the first five contours of the matched-field processor output using the first three Anderson functions that is employed in the conventional detection and localization process.
Figure 6B:
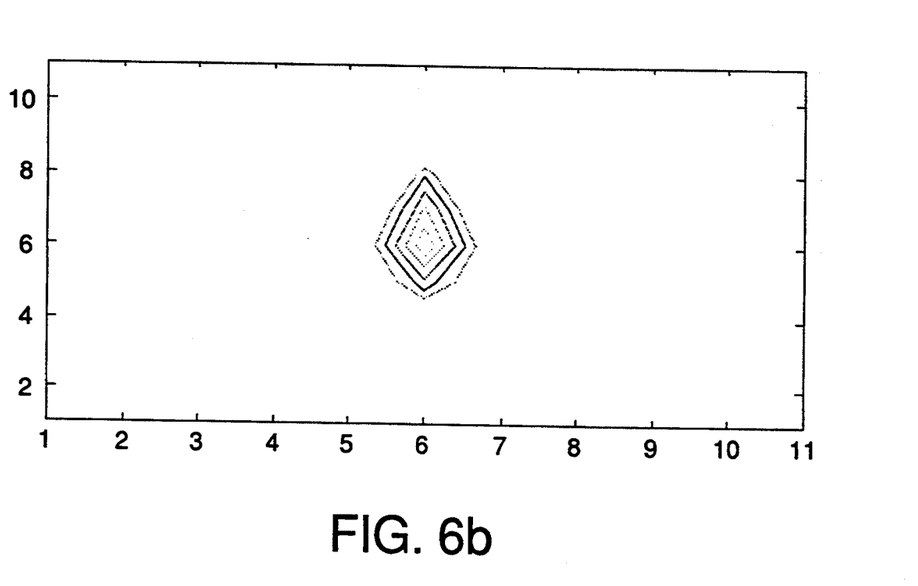
FIG. 6b shows the first five contours of the matched-field processor output using the first five Anderson functions in accordance with the present invention.

Consequently, a larger number of Anderson functions (>three) defined by $$h_i(\gamma) = \gamma^{i-}/(1+\gamma^2)^{5/2}; \ i=1,2,\ldots \gamma = \tan(\theta)$$

are used in the present dipole moment detection and localization processing. FIG. 6a shows the case of a dipole processed using a conventional dipole moment detection and localization process, and specifically the first five contours of the matched field processor output using the first three Anderson functions. FIG. 6b shows the same scenario as FIG. 6a but where five Anderson functions are used. The latter case has better resolution, as is indicated by the tighter set of contour curves. The improved resolution in the latter case is associated with the normalization of the magnitude of the dipole moment from the dipole 12a divided by the cube of the offset distance to the array of sensors 11. This normalization is accomplished by dividing by the square root of the sum-of-squares of the coefficients of the Anderson function expansion. With the present technique of using more than three Anderson functions, the denominator of the equation used in the process becomes larger in cases where there is not a good correlation match. This makes the response smaller in those regions of the magnetic response location space where there are no dipoles.

There are many other advantages of using more than three Anderson functions, such as a better description of the noise environment. This extra parameter (the dimension of the Anderson function expansion) offers one more parameter over which the signal processor has control.

In a third aspect of the present invention, resolution of multiple target dipoles 13a, 13b using multiple processing is achieved as follows. FIG. 4 shows a flow diagram representative of a multiple pass multiple dipole process 50 in accordance with the principles of the present invention. With reference to FIG. 4, the "front end" process steps 31–36, and 39 are as has been described above with reference to FIGS. 2 and 3. The third improvement of the present invention provides for processing the precomputed Anderson functions from step 35 along with the detected largest output from step 39 to compute a magnetic field due to the largest dipole 13, as is indicated in step 41. The computed field due to the largest dipole is then subtracted from the measured field as is provided in step 42. The subtracted data is then reprocessed to detect and locate the next largest dipole 13 in the detection region, as is indicated by step 43. The last three steps are repeated as necessary to detect and localize all detected dipoles 13.

Figure 7A:
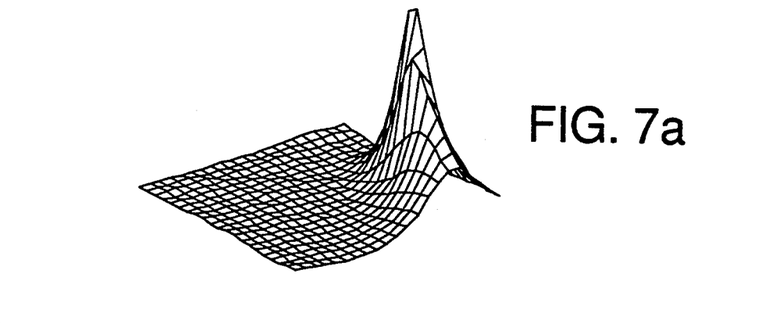
FIGS. 7a and 7b respectively show contour and mesh plots of the high-resolution output from the present invention illustrating detection and localization of a first dipole having a relatively large response in the presence of a second dipole having a relatively smaller response.
Figure 7B:
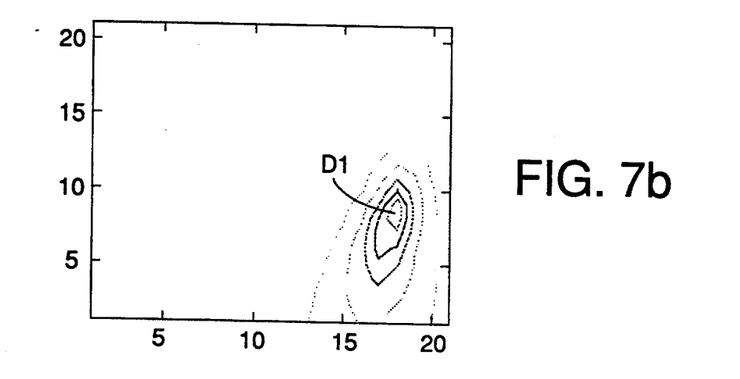
Figure 7C:
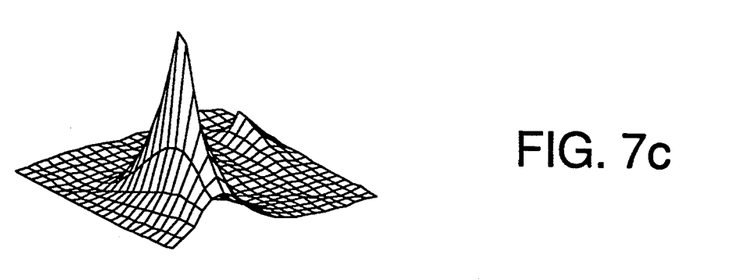
FIGS. 7c and 7d respectively show contour and mesh plots of the high-resolution output from the present invention illustrating detection and localization of the second dipole after subtraction of the relatively large response due to the first dipole.
Figure 7D:
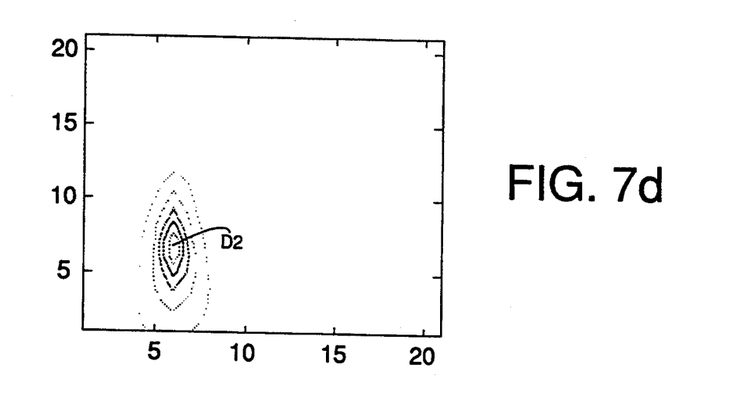

The third improvement in the dipole moment detection and localization processing, which has been simulated, is also illustrated with reference to FIGS. 7a–7d. FIGS. 7a and 7b show mesh and contour plots for the high resolution output that tire the results of processing a field of two dipoles 13a, 13b by estimating the field of the largest contributor (the first dipole 13a) and subtracting it from the measurements in order to provide for better resolution of multiple targets (the second dipole 13b). FIGS. 7c and 7d show the resulting mesh and contour plots of the high resolution output after subtraction of the larger response from the first dipole 13a.

FIGS. 7a and 7b show the result of applying the present high-resolution process to two signals, one of which is located at the point marked D1 (the first dipole 13a) and the second (the second dipole 13b) which is located at the point marked D2 (shown on the contour plot in FIG. 7d). As can be seen, because the first dipole 13a is closer to the array of sensors 11, its response completely dominates the output. FIGS. 7c and 7d, on the other hand, show the result of estimating the contribution due to the first dipole 13a at the location of the second dipole 13b. The estimated contribution to the measurements is subtracted out and the high-resolution process is repeated. As can be seen in FIG. 7d, the presence of the second dipole 13b at D2 can be detected and its location determined.

Thus there has been described an improved dipole detection and location processing and processing apparatus that provides for higher spatial resolution, that provides for the use of more than three Anderson function expansions, and multiple processing of data to achieve multiple target resolution. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A dipole detection and localization method for use with a dipole detection and localization system that provides for high resolution localization of dipoles, and wherein the dipole detection and localization system comprises an array of spatially distributed magnetic sensors that each provide output signals that are indicative of a magnetic field sensed thereby that corresponds to a magnetic dipole, processing means coupled to the array of magnetic sensors for generating a measured magnetic signature of the magnetic field produced by the presence of the magnetic dipole, and for providing correlated output signals indicative of the magnetic signature, and processing means for processing the correlated output signals to indicate a location and relative orientation of the magnetic dipole, said method comprising the steps of:

sensing a magnetic dipole using the array of spatially distributed magnetic sensors and providing output signals from each sensor that are indicative of the magnetic field sensed thereby;

processing output signals from the array of magnetic sensors to decompose the magnetic field sensed thereby into its magnetic field components to generate respective magnetic signatures produced by the magnetic field and the magnetic dipole that represent magnetic response functions of the dipole, and wherein the magnetic field components have a form of either a vector of magnetic field components or a vector of Anderson function expansion coefficients;

processing the magnetic signatures to produce a dyadic matrix;

adding a multiple of an identity matrix to the dyadic matrix to prevent singularity thereof and to provide a modified dyadic matrix; and processing the magnetic signatures in accordance with a maximum likelihood beamforming process using the modified dyadic matrix to provide signals that are indicative of the location and relative orientation of the magnetic dipole.

2. A method of detecting and localizing a magnetic dipole, said method comprising the steps of:

sensing a magnetic dipole using an array of spatially distributed magnetic sensors and providing output signals from each sensor that are indicative of magnetic field sensed thereby;

processing output signals from the array of magnetic sensors to decompose the magnetic field sensed thereby into its magnetic field components to generate respective magnetic signatures produced by the dipole that represent magnetic response functions of the dipole;

expanding the magnetic field derived from the dipole using more than three Anderson functions to provide for noise normalization and a better representation of magnetic features not caused by the dipole; and processing the magnetic signatures to provide signals that are indicative of a location and relative orientation of the dipole.

3. A method of detecting and localizing a magnetic dipole, said method comprising the steps of:

sensing a first magnetic dipole having a relatively large magnetic field using an array of spatially distributed magnetic sensors and providing output signals from each sensor that are indicative of the magnetic field sensed thereby;

estimating a location and relative orientation of the first dipole by:

processing output signals from the array of magnetic sensors to decompose the magnetic field sensed thereby into its magnetic field components to generate respective magnetic signatures produced by the first dipole and that represent magnetic response functions of the first dipole;

expanding the magnetic field derived from the first dipole using more than three Anderson functions to normalize range dependence and noise; and processing the magnetic signatures to provide signals that are indicative of the location and relative orientation of the first dipole; and subtracting out a magnetic field contribution due to the first dipole at each sensor in the array of magnetic sensors;

estimating a location and relative orientation of a second magnetic dipole having a smaller magnetic field than the first dipole by:

processing output signals from the array of magnetic sensors to decompose the magnetic field sensed thereby into its magnetic field components to generate respective magnetic signatures produced by the second dipole and that represent magnetic response functions of the second dipole;

expanding the magnetic field derived from the second dipole using more than three Anderson functions to normalize noise and better represent clutter features; and processing the magnetic signatures to provide signals that are indicative of the location and relative orientation of the second dipole.

* * * * *